Sept. 4, 1956 M. CAMRAS 2,761,911

MAGNETIC HEAD ASSEMBLY

Filed Jan. 28, 1952

Inventor
Marvin Camras by Hill, Sherman, Meroni, Gross & Simpson Attys

United States Patent Office 2,761,911
Patented Sept. 4, 1956

2,761,911

MAGNETIC HEAD ASSEMBLY

Marvin Camras, Chicago, Ill., assignor to Armour Research Foundation of Illinois Institute of Technology, Chicago, Ill., a corporation of Illinois Application January 28, 1952, Serial No. 268,631

13 Claims. (Cl. 179—100.2)

The present invention relates to an improved electromagnetic head assembly for use in magnetic recording and reproducing apparatus.

Electromagnetic heads for magnetic recording purposes, whether they be recording heads, reproducing heads, or erasing heads consist of a ferromagnetic circuit including spaced pole portions separated by a non-magnetic gap. In recent years, the tendency in electromagnetic head design has been toward smaller and smaller heads, and shorter non-magnetic gaps. The latter are desirable from the standpoint of increasing the high frequency response of the electromagnetic head. However, as the head is made smaller and thinner, it is increasingly difficult to maintain the proper critical gap dimensions and to maintain a perfect alignment between the opposed pole portions defining the non-magnetic gap.

With the foregoing in mind, an object of the present invention is to provide an improved electromagnetic head assembly for recording, reproducing, and erasing purposes which includes means for maintaining the opposed pole portions of the head in their proper alignment.

Another object of the present invention is to provide an improved electromagnetic head in which a relatively thin core is provided with support means which give the sides of the core a positive side support as well as holding a non-magnetic spacer in the gap between the opposed pole portions under a slight pressure.

Another object of the present invention is to provide an improved electromagnetic head which can be manufactured from simple metal stampings and rapidly assembled into a complete head structure.

The novel features which I believe to be characteristic of my invention are set forth with particularity in the appended claims. My invention itself, however, both as to its manner of construction and method of operation together with other objects and advantages thereof may best be understood by reference to the following description taken in connection with the accompanying drawings, in which:

As shown in the drawings.

Figure 1:
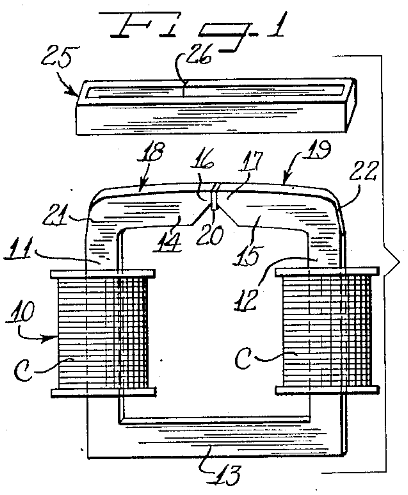
Figure 1 is an exploded view of the components making up the improved electromagnetic head of the present invention.

The invention as shown in the drawings is applied to an electromagnetic core structure 10 composed of a single lamination of iron or other ferromagnetic material, although it will be appreciated that the invention is equally applicable to head structures made up of a plurality of laminations and to head structures of various geometric shapes. As seen in Figure 1, the core structure 10 includes opposite upstanding leg portions 11 and 12 and a base leg 13. The legs 11 and 12 are provided with integral extensions 14 and 15 which have cooperating tapered pole portions 16 and 17 defining a non-magnetic gap therebetween. The upper surfaces of the extensions 14 and 15, generally indicated at numerals 18 and 19, define record engaging surfaces for receiving an elongated magnetic record member thereacross. A pair of coils "C" are disposed on the legs 11 and 12, one of the coils supplying an alternating magnetic field corresponding to the audio signal and the other providing a relatively high frequency bias field, when the head is employed as a recording head.

The space between the confronting pole portions 16 and 17 is provided with a non-magnetic spacer 20 composed of solder, copper, or other non-magnetic material.

As best seen in Figure 1, the top portions of the legs 11 and 12 are slightly tapered as indicated at 21 and 22 to receive a band 25 in closely fitting relation. The band 25 may be composed of any suitable non-magnetic material, and preferably consists of copper so that when the band is placed over the head structure in proximity to the non-magnetic gap, the eddy currents set up in the copper confine the magnetic field to the region of the non-magnetic gap. In addition to copper, materials such as beryllium copper, aluminum, and non-metallic materials such as phenolic resins can also be employed. In the form of the invention illustrated in Figure 1, the band 25 is split as at 26 to give it added flexibility, and for convenience of manufacture.

Figure 2:
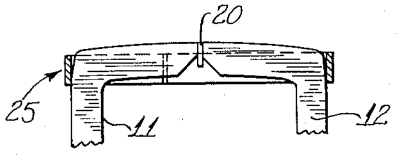
Figure 2 is a fragmentary view, with parts in elevation, and partially in section illustrating the components of Figure 1 in assembled relation.

As the band 25 is placed over the core 10 as illustrated in Figure 2, the opposite end walls of the band 25 engage the tapered portions 21 and 22 of the core structure, the spacing between the opposed side walls of the band 25 being sufficiently small so that these walls provide a positive side support for the pole portions 16 and 17. At the same time, the tight engagement of the ends of the band 25 with the tapered portions 21 and 22 provide a positive pressure on the pole portions 16 and 17, keeping the non-magnetic spacer 20 tightly engaged therebetween.

Figure 3:
Figure 3 is a plan view of a modified head embodying features of the present invention.
Figure 4:
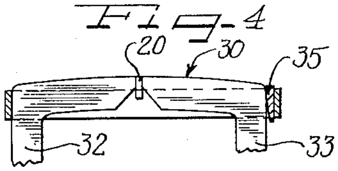
Figure 4 is a fragmentary view in elevation and partially in cross-section, of the head shown in Figure 3.

In the modified form of the invention illustrated in Figures 3 and 4, a core 30 substantially identical with core 10 illustrated in Figures 1 and 2 is employed, with the exception that the tapered wall portions 21 and 22 are eliminated. In this form of the invention, a continuous band 31 engages the opposed legs 32 and 33 of the core 30, and a removable, triangularly shaped wedge 35 is pressed between the end of the leg 33 and the inner end wall of the band 31.

The tapering of the legs, as in Figures 1 and 2 and the use of a wedge element as in Figures 3 and 4 represent two means by which tight engagement can be secured between the non-magnetic band and the magnetic core structure. It will be appreciated by those skilled in the art that other suitable engaging means can be employed, such as by providing a series of teeth on the legs of the electromagnetic core structure which tightly grip the non-magnetic band to urge the pole portions of the core structure together and prevent relative lateral movement between the pole portions.

Figure 5:
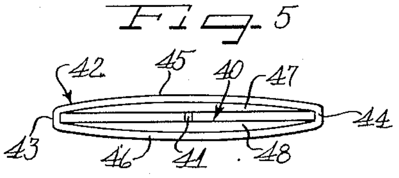
Figure 5 is a plan view of a still further modified head.
Figure 6:
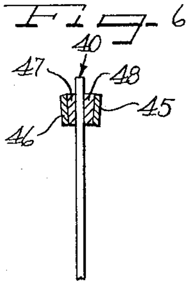
Figure 6 is a side elevational view, partially in cross-section, of the head illustrated in Figure 5.

In the form of the invention illustrated in Figures 5 and 6, an electromagnetic core 40 having a non-magnetic spacer 41 between the opposed pole portions is provided with a band 42 having relatively straight end walls 43 and 44 and convex side walls 45 and 46. In this form of the invention, a pair of slightly convex wedge elements 47 and 48 are interposed between the flat sides of the core 40 and the side walls 45 and 46 of the band 42, the wedge elements 47 and 48 being slightly tapered to secure good frictional engagement. As an alternative form of structure, the wedge elements 47 and 48 can project above the side walls 45 and 46 and then taper up to the record-engaging surface of the core.

Figure 7:
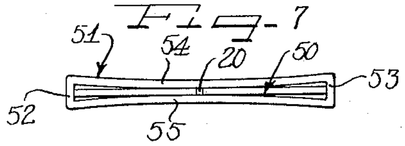
Figure 7 is a plan view of a still further modified form of the invention.
Figure 8:
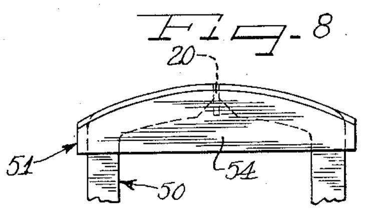
Figure 8 is fragmentary view with parts in elevation of the head of Figure 7.
Figure 9:
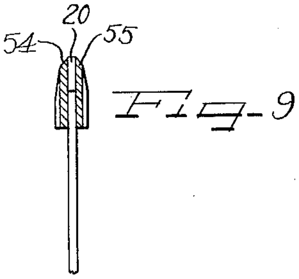
Figure 9 is a cross-sectional view of the head structure illustrated in Figure 8.

In the form of the invention illustrated in Figures 7–9, an electromagnetic core structure 15 having a spacer 20 between the opposed pole portions thereof is provided with a non-magnetic band 51. The band 51 has relatively straight end walls 52 and 53 and concave side walls 54 and 55 pressing against the core 50 by the natural springiness of the material making up the band 51.

As best illustrated in Figure 8, the band 51 has the top edges of the side walls 54 and 55 tapered and contoured to substantially the same contour as the record engaging surface defined by the core 50. This arrangement gives a closer fit as well as providing good reinforcement at the edges of the magnetic core 50.

While several embodiments of the invention are illustrated in the drawings, it will be recognized that various other modifications can be made to secure the close fit between the non-magnetic band and the electromagnetic core. For example, either the legs of the core or the band can be tapered to secure good wedged engagement in the absence of additional wedge members.

It will be evident that various other modifications and variations may be effected without departing from the scope of the novel concepts of the present invention.

I claim as my invention:

1. An electromagnetic head assembly comprising a magnetic core structure including spaced pole portions defining a non-magnetic gap therebetween, and a non-magnetic band carried by said core structure in relatively tight engagement, said band having means associated therewith providing positive side support for said pole portions directly at said gap.

2. An electromagnetic head assembly comprising a magnetic core structure including spaced pole portions defining a non-magnetic gap therebetween, a non-magnetic spacer held within said gap, and a non-magnetic band carried by said core structure in relatively tight engagement, said band having means associated therewith providing positive side support for said pole portions immediately adjacent said gap and holding said spacer in place under pressure.

3. An electromagnetic head assembly comprising a pair of spaced legs, extensions on said legs defining a record engaging surface, a non-magnetic spacer between the ends of said extensions, and means comprising a non-magnetic band of conductive material engaging said spaced legs to provide positive side support for said extensions and extending in proximity to said gap to confine the magnetic field between said extensions to the region of said gap.

4. An electromagnetic head assembly comprising a magnetic core structure including spaced pole portions having broad flat side surfaces and having confronting end edges defining a non-magnetic gap therebetween, and means comprising a non-magnetic band of constant rectangular cross section and ring configuration providing broad flat side surfaces parallel to and in extended engagement with the broad flat side surfaces of said pole portions, said band being in wedged engagement with said core structure, said means providing positive side support for said pole portions.

5. An electromagnetic head assembly comprising a magnetic core structure including spaced confronting pole portions defining a non-magnetic gap therebetween, and means comprising a split non-magnetic band engaging said core structure in the vicinity of said pole portions to provide positive side support for said pole portions, said band being of conductive material and extending on either side of and overlying the ends of the confronting pole portions to confine the magnetic field therebetween.

6. An electromagnetic head assembly comprising a pair of spaced legs, extensions on said legs defining a record engaging surface, a non-magnetic spacer between the ends of said extensions, a non-magnetic band engaging said spaced legs to provide positive side support for said extensions, and wedge means between one of said legs and said band.

7. An electromagnetic head assembly comprising a pair of spaced legs, extensions on said legs defining a record engaging surface, a non-magnetic spacer between the ends of said extensions, a non-magnetic band having convex side portions and relatively straight end portions engaging the opposed ends of said legs, and wedge means between said extensions and said convex side portions.

8. An electromagnetic head assembly comprising a pair of spaced legs, extensions on said legs defining a record engaging surface, a non-magnetic spacer between the ends of said extensions, and a non-magnetic band having concave side portions pressing against said extensions in the region of said spacer to provide positive side support for said extensions and holding said spacer in place under pressure.

9. An electromagnetic head assembly comprising a pair of spaced legs, extensions on said legs defining a record engaging surface, a non-magnetic spacer between the ends of said extensions, and a non-magnetic band having concave side portions pressing against said extensions in the region of said spacer to provide positive side support for said extensions and holding said spacer in place under pressure, the top edges of said concave side portions having a contour substantially identical with the contour of said record engaging surface.

10. An electromagnetic head assembly comprising a pair of spaced legs, extensions on said legs defining a record engaging surface, a non-magnetic spacer between the opposed ends of said extensions, and a non-magnetic band having side portions pressing against said extensions in the region of said spacer to provide positive side support for said extensions and holding said spacer in place under pressure, the top edges of said side portions having a contour conforming substantially with the contour of said record engaging surface.

11. An electromagnetic head assembly comprising a ring-type magnetic core structure including inturned extensions having broad flat side surfaces and a tape-contacting upper surface relatively narrow in relation to the height of said side surfaces and terminating in confronting pole portions having end edges defining a non-magnetic gap therebetween, and a band of non-magnetic material embracing said core structure and having integral broad flat side surfaces on the inner side thereof in extended flat surface engagement with said broad flat side surfaces of said extensions on each side thereof immediately adjacent said gap.

12. An electromagnetic head assembly comprising a pair of spaced generally parallel upright legs, inturned extensions on the respective legs and extending substantially at right angles to said legs and toward each other and terminating in directly confronting end edges defining a non-magnetic gap therebetween, said extensions having opposite broad flat vertical side surfaces and having upper horizontal tape-receiving surfaces of breadth substantially less than the height of said side surfaces, and a band of non-magnetic material of constant rectangular cross section and loop configuration encircling said extensions and having broad vertical surfaces extending generally parallel to the broad flat side surfaces of said extensions and in broad flat extended surface-to-surface engagement therewith immediately adjacent said gap.

13. An electromagnetic head assembly comprising a pair of spaced generally parallel upright legs, inturned extensions on the respective legs and extending substantially at right angles to said legs and toward each other and terminating in directly confronting end edges defining a non-magnetic gap therebetween, said extensions having opposite broad flat side surfaces and upper tape-receiving surfaces of breadth substantially less than the height of said side surfaces, and a band of non-magnetic material of constant rectangular cross section and loop configuration encircling said extensions and having broad flat constraining surfaces extending generally parallel to the broad flat side surfaces of said extensions and in broad flat extended surface-to-surface engagement therewith immediately adjacent said gap, said broad flat constraining surfaces being integral with said band at the inner side thereof.

References Cited in the file of this patent

UNITED STATES PATENTS

| | | |
|---|---|---|
| 2,290,680 | Franz | July 21, 1942 |
| 2,318,095 | Putman | May 4, 1943 |
| 2,574,707 | Peltus | Nov. 13, 1951 |
| 2,587,097 | Berlant | Feb. 26, 1952 |
| 2,658,113 | Holmes | Nov. 3, 1953 |